United States Patent Office 3,544,608
Patented Dec. 1, 1970

3,544,608
TRICYCLOHEXYLTIN ISOTHIOCYANATE AND A PROCESS FOR MAKING ORGANOTIN SALTS
Kailash C. Pande, Midland, Mich., assignor to The Dow Chemical Company, Midland, Mich., a corporation of Delaware
No Drawing. Filed Feb. 5, 1968, Ser. No. 702,791
Int. Cl. C07f 7/22
U.S. Cl. 260—429.7      9 Claims

ABSTRACT OF THE DISCLOSURE

Organotin salts of the formula $R_nSnZ_{(4-n)}$ are made by a process comprising reacting an organotin compound containing the group

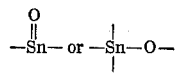

with the appropriate ammonium salt, $NH_4Z$, where Z is an anion and n is an integer of from one to three, inclusive. A new compound, tricyclohexyltin isothiocyanate, is produced by the process. The compounds produced have biological activity.

BACKGROUND OF THE INVENTION

Organotin compounds of the formula $R_nSnZ_{(4-n)}$ are well known in the art. See Ingham et al., Chem. Rev., 60, 459 (1960). They are generally prepared by reacting organotin oxides with acids or by reacting organotin halides with metal salts.

SUMMARY OF THE INVENTION

It has now been found that organotin salts having the formula $R_nSnZ_{(4-n)}$ are made by a process comprising reacting an organotin compound containing the group

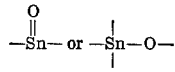

with an ammonium salt having the formula $NH_4Z$ wherein in all the above formulas, each R independently is alkyl, cycloalkyl, aryl, alkoxy, cycloalkoxy or aryloxy (each R independently preferably having up to eighteen carbon atoms and most preferably up to ten carbon atoms); each Z independently is one equivalent of an anion, for example chloro, bromo, iodo, azido, isocyanato, thiocyanato, cyanato, sulfato, nitrato, or acyloxy having up to eighteen carbon atoms (acyloxy preferably having up to ten carbon atoms; and n is an integer of from one to three, inclusive. Of course, it is understood that each R independently can contain substituents which are inert under the reaction conditions; examples are halo, nitro, alkoxy, aryloxy, aryl, alkyl, cycloalkyl and cyano.

In order to practice this invention, an organotin compound containing the group

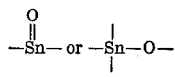

is reacted with an ammonium salt in any convenient manner so as to produce an organotin salt of the formula $R_nSnZ_{(4-n)}$. The product is then separated from the product mixture by conventional methods (e.g. distillation). While not necessary to the invention, it is preferred to conduct the reaction in the presence of an inert solvent.

Typical of the organotin compounds containing the group

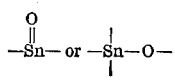

which are useful as starting materials are the organotin oxides, hydroxides, esters and acids. Included within the term organotin oxide are compounds having the formula $R_2SnO$ [e.g. dibutyltin oxide, dimethyltin oxide, dibenzyltin oxide, butylphenyltin oxide, bis(p-bromophenyl)tin oxide, bis(p-methoxyphenyl)tin oxide, bis(p-methoxyphenyl)tin oxide, diethyltin oxide] and $(R_3Sn)_2O$ [e.g. bis(tribenzyltin) oxide, bis(tributyltin) oxide, bis(butyldimethyltin) oxide]. Included within the term organotin hydroxide are compounds having the formulas $R_3SnOH$ [e.g. benzylbutylphenyltin hydroxide, tribenzyltin hydroxide, triethyltin hydroxide, tricyclohexyltin hydroxide, trimethyltin hydroxide] and $R_2Sn(OH)_2$ [e.g. dicyclohexyltin dihydroxide, di-tert-amyltin dihydroxide, diphenyltin dihydroxide]. Included within the term organotin esters are compounds having the formulas $R_3SnOR$ [e.g. (benzyloxy)tributyltin, (methoxy)tributyltin, (methoxy)triethyltin], $R_2Sn(OR)_2$ [e.g. diethyldimethoxytin, dimethyldiphenoxytin] and $RSn(OR)_3$ [e.g. tris(methoxy)phenyltin, tris(phenoxy)methyltin]. Included within the term organotin acids are compounds having the formula $RSn(O)OH$ [e.g. phenylstannoic acid, butylstannoic acid, ethylstannoic acid].

The ammonium salts useful in this invention include ammonium chloride, ammonium bromide, ammonium iodide, ammonium azide, ammonium cyanate, ammonium thiocyanate, ammonium cyanide, ammonium sulfate, ammonium nitrate and the ammonium acyloxy compounds (e.g. ammonium acetate, ammonium benzoate and ammonium stearate).

Some typical reactions which the organotin compound and the ammonium salt undergo are:

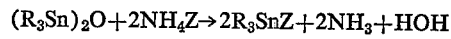
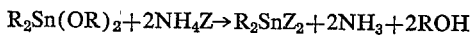
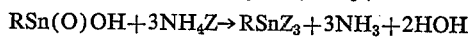

Some of the organotin salts of the formula $R_nSnZ_{(4-n)}$ which are produced by these or similar reactions are triphenyltin chloride, triamyltin bromide, phenyldibutyltin iodide, phenyldioctyltin bromide, bis(bromomethyl)tin dibromide, diethyltin diiodide, hexadecyltin tribromide, methyltin trichloride, triethyltin isocyanate, triethyltin isothiocyanate, diethyltin dinitrate, bis-triethyltin sulfate, diethyltin sulfate, dimethyltin dicyanate and diphenyltin diisocyanate.

This process is operable over a wide range of temperatures and pressures. It is generally suitable to conduct the reaction at a temperature between 20° and 125° C., preferably between 50° and 100° C. and most preferably between 60° and 80° C. It is preferred to use atmospheric pressure, although subatmospheric and superatmospheric pressures can be employed.

The molar ratios of reactants are not critical to this invention, but, in general, better yields are obtained if the reactants are used in stoichiometric amounts. If desired, a solvent which is inert under the reaction conditions can be used. Examples of suitable solvents include benzene, n-heptane, xylene, petroleum ether and the like.

The compounds produced by this process have biological activity. They are useful insecticides and pesticides. For example, the compound $(CH_3)_3SnSCN$ was dispersed in water containing mosquito larvae to provide a composition containing 500 parts by weight of said compound per million parts of composition. 100% kill of mosquito larvae was obtained. Similarly, the compound $(C_6H_{11})_3SnI$ was dispersed in water containing mosquito larvae to provide a composition containing 1 part by weight of said compound per million parts of composition. 100% kill of mosquito larvae was obtained. A new compound is made by use of the present invention. This compound, tricyclohexyltin isothiocyanate [$(C_6H_{11})_3SnSCN$], was dispersed in water to provide a composition containing 100 parts by weight of said compound per million parts of composition. A young bean plant, with two-spotted spider mites on its foliage, was dipped into this composition so as to wet the surface of the foliage. 100% kill of the spider mites was obtained with little or no damage to the young bean plant. The organotin salts and their derivatives are also used in such fields as stabilizers for paints, catalysts for polyesters and polyurethanes and antioxidants.

DESCRIPTION OF SPECIFIC EMBODIMENTS

Following are specific examples of the practice of this invention.

EXAMPLE 1

Reactions of ammonium halides with organotin oxides, hydroxides and esters

Typically, a mixture of organotin oxide, hydroxide or ester (0.1 mole) and ammonium halide (0.24 mole for oxides and 0.12 mole for hydroxides and esters) in dry methylcyclohexane (250 ml.) in a flask equipped with a trap connected to a condenser, and magnetic stirring assembly was heated (with fast stirring) at reflux for a varying degree of time. During this period, ammonia gas escaped through the condenser and the water formed was collected in the trap. After distilling the water out, most of the solvent was also removed through the trap. The reaction mixture was cooled and the unreacted ammonium halide was filtered off. The filtrate was fractionated to yield the corresponding organotin halides. Results are reported in Table I below.

EXAMPLE 2

Preparation of di-n-butyltin diisothiocyanates (a) From di-n-butyltin oxide.—Di-n-butyltin oxide (11.0 g.) and ammonium thiocyanate (7 g.) were suspended in methylcyclohexane (400 ml.). The reaction mixture was slowly heated to reflux with vigorous stirring and refluxed for approximately 10 hours. During this period ammonia was evolved and the water produced was collected. Methylcyclohexane (ca. 300 ml.) was then distilled and an insoluble white mass settled out. This was suspended in boiling chloroform (250 ml.) and then filtered hot to remove unreacted ammonium thiocyanate. The filtrate was concentrated to about 100 ml. and then allowed to crystallize. Impure di-n-butyltin diisothiocyanate (11.5 g.) precipitated as white, shiny crystals, M.P. 140–145° C. A small portion of this was recrystallized from ether to yield pure material.

(b) From di-n-butyltin di-n-butoxide.—Ammonium thiocyanate (5.0 g.) was dried by refluxing with stirring in toluene (350 ml.) and removing 50 ml. of distillate. This was then cooled to room temperature and di-n-butyl- tin di-n-butoxide (7.5 g.) was added. The reaction mixture was refluxed for 5 hours, during which period the n-butanol-toluene azeotrope was removed by distillation. After evaporating the excess toluene a white powder was obtained, which was refluxed with chloroform (175 ml.) and filtered hot to remove unreacted ammonium thiocyanate. On concentrating the filtrate, fine crystals of di-n-butyltin diisothiocyanate (6.0 g.) precipitated out.

EXAMPLE 3

Preparation of tri-n-butyltin isothiocyanate (a) From bis-tri-n-butyltin oxide.—A mixture of bis-(tri-n-butyltin) oxide (41 g.) and ammonium thiocyanate (12 g.) in methylcyclohexane (125 ml.) was refluxed with stirring for 4 hours. Ammonia was evolved and water was removed as above. Methylcyclohexane (80 ml.) was then distilled, leaving a white slurry. This was filtered and the filtrate fractionated to give pure tri-n-butyltin isothiocyanate (42 g.).

(b) From tri-n-butyltin-n-butoxide.—Ammonium thiocyanate (11.5 g.) was dried by refluxing with stirring in toluene (350 ml.), and then distilling about 50 ml. of the toluene. To this was added tri-n-butyltin-n-butoxide (17.5 g.) and the reaction mixture was refluxed with stirring for 4 hours, during which period the n-butanol-toluene azeotrope was fractionated out. On evaporating toluene from the reaction mixture, a white solid mixed with some viscous liquid was obtained. This was diluted with water and extracted with methylene chloride. The organic layer was dried ($MgSO_4$) and on fractionation yielded pure tri-n-butyltin isothiocyanate (12.0 g.).

EXAMPLE 4

Preparation of tricyclohexyltin isothiocyanate

This new compound (22.0 g.) was prepared from tricyclohexyltin hydroxide (27 g.), ammonium thiocyanate (5.4 g.) and methylcyclohexane (125 ml.) in the manner described above for the preparation of di-n-butyltin diisothiocyanate, M.P. 123° C.

Calculated (percent): Sn, 27.8; C, 53.5; H, 7.86; S, 7.52; N, 3.28. Found (percent): Sn, 27.8; C, 53.8; H, 7.85; S, 7.55; N, 3.23.

EXAMPLE 5

Preparation of triphenyltin isothiocyanate

Triphenyltin hydroxide (3.7 g.) and ammonium thiocyanate (1.4 g.) was refluxed in methylcyclohexane (75 ml.). Water was removed and then most of the methylcyclohexane was distilled. The insoluble mass was refluxed with chloroform (30 ml.) and the filtrate yielded the needle-shaped crystals of triphenyltin isothiocyanate (4 g.), M.P. 168–170.5° C. Recrystallization gave the pure product.

TABLE I.—INTERACTION OF AMMONIUM HALIDES WITH ORGANOTIN OXIDES, HYDROXIDES AND ESTERS

| Organo starting material | Z in $NH_4Z$ | Reaction time, hrs. | Reaction product | Percent yield |
| --- | --- | --- | --- | --- |
| $(n-C_4H_9)_2SnO$ | I | 3 | $(n-C_4H_9)_2SnI_2$ | 92 |
|  | Br | 8 | $(n-C_4H_9)_2SnBr_2$ | 80 |
|  | Cl | 15 | $(n-C_4H_9)_2SnCl_2$ | 70 |
| $(CH_3)_2SnO$ | I | 8 | $(CH_3)_2SnI_2$ | 60 |
| $[(n-C_3H_7)_3Sn]_2O$ | I | 4 | $(n-C_3H_7)_3SnI$ | 88 |
|  | Br | 8 | $(n-C_3H_7)_3SnBr$ | 80 |
|  | Cl | 12 | $(n-C_3H_7)_3SnCl$ | 62 |
| $[(n-C_4H_9)_3Sn]_2O$ | I | 2 | $(n-C_4H_9)_3SnI$ | 91 |
|  | Cl | 12 | $(n-C_4H_9)_3SnCl$ | 72 |
| $(C_6H_5)_3SnOH$ | I | 2 | $(C_6H_5)_3SnI$ | 90 |
|  | Cl | 10 | $(C_6H_5)_3SnCl$ | 67 |
| $(Cyclo-C_6H_{11})_3SnOH$ | I | 2 | $(Cyclo-C_6H_{11})_3SnI$ | 94 |
|  | Br | 6 | $(Cyclo-C_6H_{11})_3SnBr$ | 85 |
| $(n-C_4H_9)_2Sn(OC_4H_9)_2$ | I | 3 | $(n-C_4H_9)_2SnI_2$ | 93 |
|  | Cl | 24 | $(n-C_4H_9)_2SnCl_2$ | 73 |
| $(n-C_4H_9)_3Sn(OC_4H_9)$ | I | 2.5 | $(n-C_4H_9)_3SnI$ | 94 |

EXAMPLE 6

Preparation of tri-n-propyltin isothiocyanate

A mixture of bis-n-propyltin oxide (26 g.) and ammonium thiocyanate (8 g.) in benzene (100 ml.) was stirred at room temperature (27° C.) for approximately four hours. Ammonia was evolved and water was formed. The reaction mixture was now poured into water (200 ml.) and extracted with more benzene (75 ml.). The organic layer after drying (MgSO$_4$) was fractionated to yield a colorless liquid, B.P. 110–130° (27 g.).

I claim:

1. A process for making an organotin salt having the formula $R_nSnZ_{(4-n)}$ comprising reacting an organotin compound having one of the formulas $$(R_3Sn_2)_2O$$
$$R_2SnO$$
$$R_2Sn(OH)_2$$
$$R_2Sn(OR)_2$$
$$R_3SnOR$$
$$RSn(O)OH$$
$$R_3SnOH$$

with an ammonium salt having the formula NH$_4$Z where each R independently is alkyl, cycloalkyl, aryl, alkoxy, cycloalkoxy or aryloxy; each Z independently is one equivalent of an anion; and *n* is an integer of from one to three, inclusive, with the removal of ammonium.

2. A process as defined in claim 1 wherein each R independently contains up to eighteen carbon atoms.

3. A process as defined in claim 1 wherein the anion is chloro, bromo, iodo, azido, isocyanato, thiocyanato, cyanato, sulfato, nitrato, or acyloxy having up to eighteen carbon atoms.

4. A process as defined in claime 1 wherein the temperature is between 20° and 125° C.

5. A process as defined in claim 1 wherein the temperature is between 50° and 100° C.

6. A process as defined in claim 1 wherein a stoichiometric amount of reactants is used.

7. A process as defined in claim 1 wherein the reaction occurs in the presence of an inert solvent.

8. A process as defined in claim 1 wherein the anion is chloro, bromo, iodo or isocyanato.

9. A new compound having the formula $$(C_6H_{11})_3SnSCN$$

References Cited

UNITED STATES PATENTS

| | | | |
|---|---|---|---|
| 2,912,448 | 11/1958 | Ramsden | 260—429.7 |
| 3,311,647 | 3/1967 | Stamm | 260—429.7 |
| 3,311,646 | 3/1967 | Washburn et al. | 260—429.7 X |

OTHER REFERENCES

Schweitzer et al., J. Inorg. Nucl. Chem. (1965), vol. 27, pp. 191–6, QD601A1.

TOBIAS E. LEVOW, Primary Examiner

F. W. BELLAMY, Assistant Examiner

U.S. Cl. X.R.

252—405, 406, 431; 424—288